(12) United States Patent
Pritchard et al.

(10) Patent No.: US 6,562,268 B1
(45) Date of Patent: *May 13, 2003

(54) INTERIOR TRIM PANELS AND METHOD FOR MANUFACTURING SUCH PANELS USING SILACEOUS MATERIALS

(75) Inventors: James Pritchard, Somersworth, NH (US); William Humphrey, Dover, NH (US); Wayne Salisbury, Middletown, NH (US)

(73) Assignee: Davidson Textron, INC, Troy, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1254 days.

(21) Appl. No.: 08/577,915

(22) Filed: Dec. 21, 1995

(51) Int. Cl.$^7$ .......................... B29C 67/20; B29C 35/02
(52) U.S. Cl. .................. 264/137; 264/135; 264/257; 264/258
(58) Field of Search ................................ 264/134, 135, 264/136, 137, 257, 258, DIG. 14, DIG. 18

(56) References Cited

U.S. PATENT DOCUMENTS

| | | | |
|---|---|---|---|
| 3,979,344 A | * | 9/1976 | Bryant et al. ............ 260/18 TN |
| 4,374,237 A | | 2/1983 | Berger et al. |
| 4,567,228 A | | 1/1986 | Gaa et al. |
| 4,645,816 A | | 2/1987 | Pohl et al. |
| 4,910,067 A | | 3/1990 | O'Neill |
| 4,983,442 A | | 1/1991 | Patel et al. |
| 5,068,001 A | | 11/1991 | Haussling |
| 5,087,311 A | | 2/1992 | Elliott et al. |
| 5,089,328 A | | 2/1992 | Doerer et al. |
| 5,108,691 A | | 4/1992 | Elliott |
| 5,182,174 A | | 1/1993 | Stephenson |
| 5,204,404 A | | 4/1993 | Werner, Jr. et al. |
| 5,225,248 A | | 7/1993 | Stephenson |
| 5,230,962 A | | 7/1993 | Stephenson |
| 5,270,082 A | | 12/1993 | Lin et al. |
| 5,286,569 A | | 2/1994 | Werner, Jr. et al. |
| 5,306,765 A | | 4/1994 | Kuriyama et al. |
| 5,308,678 A | | 5/1994 | Tsujimura et al. |
| 5,354,808 A | | 10/1994 | Onwumere et al. |
| 5,366,807 A | | 11/1994 | Fey |
| 5,368,943 A | | 11/1994 | Baghdachi et al. |
| 5,378,735 A | | 1/1995 | Hosokawa et al. |
| 5,393,474 A | | 2/1995 | Souders |
| 5,426,166 A | * | 6/1995 | Usifer et al. ................ 526/301 |
| 5,484,864 A | * | 1/1996 | Usifer et al. ................ 526/301 |

* cited by examiner

*Primary Examiner*—Jan H. Silbaugh
(74) *Attorney, Agent, or Firm*—Grossman, Tucker, Perreault & Pfleger, PLLC

(57) ABSTRACT

Described is an interior trim panel (20) and method of manufacturing same comprising the steps of:

providing a foam trim panel (22), treating the foam panel with a coating composition containing a polymerizable polymer, and an organofunctional silaceous material; and shaping and curing the treated panel to a desired configuration so that the organofunctional silaceous material reacts and cures to assist in the foam panel retaining its desired configuration.

8 Claims, 1 Drawing Sheet

INTERIOR TRIM PANELS AND METHOD FOR MANUFACTURING SUCH PANELS USING SILACEOUS MATERIALS

CROSS REFERENCE TO RELATED CASES

Applicant hereby incorporates by reference Provisional Application Ser. No. 60/002,812, filed Aug. 25, 1995, entitled "Method of Preparing Metallized Island Coating Product Without Etching".

FIELD OF THE INVENTION

The invention pertains to interior foam trim panels utilizing isocyanate reactants to rigidify the foam panel.

BACKGROUND OF THE INVENTION

Foam panels that are used for interior trim are well known. See for example, U.S. Pat. No. 5,393,474, hereby incorporated by reference.

Foam layers containing an isocyanate group for impregnating a foam and causing it to harden during the curing process are described in a number of patents, see U.S. Pat. No. 5,089,328 which is incorporated by reference. In a similar fashion, see U.S. Pat. Nos. 5,308,678 and 5,068,001 which are incorporated by reference.

The difficulty with the foams that contain an isocyanate material that are used for impregnating and curing of the foam is that the isocyanate is fairly reactive during processing conditions such as occurs in high humidity areas. In addition, utilization of a catalyst that may have undesirable aroma in the working place may be of a concern to certain susceptible individuals.

It is an object of the present invention to describe a foam based interior trim panel where the free-NCO groups have been reacted with an organofunctional silaceous material so that no free-NCO is available for a reaction prior to final curing and rigidifying the foam panel.

SUMMARY OF THE INVENTION

Described is a method of forming a trim panel comprising the steps of:
providing a foam trim panel,
treating the foam panel with a coating composition containing a polymerizable polymer, e.g. a urethane, and an organofunctional silaceous material; and
shaping and curing the treated panel to a desired configuration so that the organofunctional silaceous material reacts and cures to assist in the foam panel retaining its desired configuration.

Preferably when the urethane coating is used, the polymer has been reacted with an organofunctional silaceous material resulting in a polymeric material having substantially no free-NCO groups, as applied to the panel.

DESCRIPTION OF PREFERRED EMBODIMENT

Figure 1:
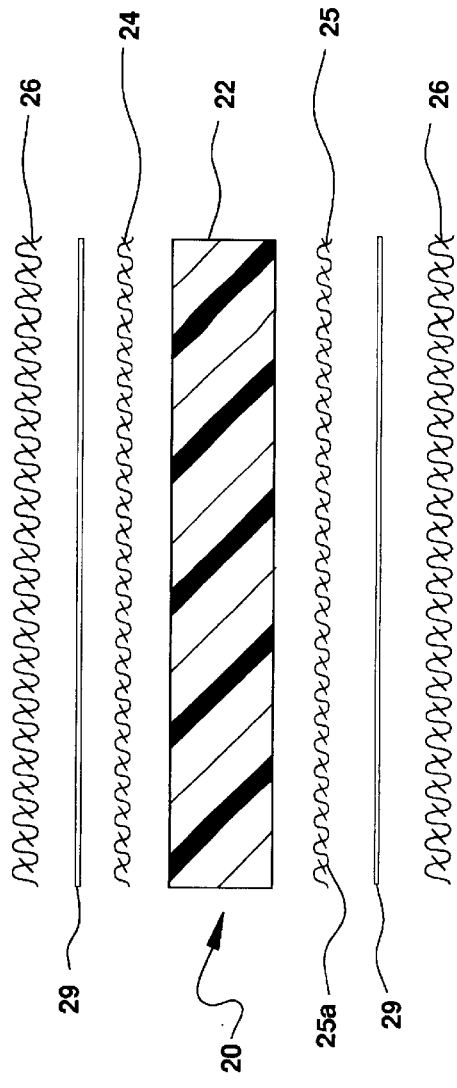
FIG. 1 is an exploded view of the components of the composite article which is an interior trim panel described in the present case.

The present invention is concerned with interior trim panels. Trim panels are made from a foam material which can be any open cell construction. Generally the foam is a urethane foam. Alternatively, however, the foam based material can be a wide variety of other materials such as a non-woven fabric of a synthetic fiber such as polypropylene fiber, polyester fiber, polyamide fiber, acrylic fiber or acetate fiber, a fibrous trim material such as piled fabric, and the like.

In the manufacturing process, the foam material is impregnated with a composition containing a polymerizable polymer, e.g. a urethane containing material. By "polymerizable polymer" is meant that the polymer can react further during processing of the panel.

It has been found highly desirable that the urethane containing material contain an organofunctional silaceous material to react with the free-NCO groups so that during the processing steps, there is no free-NCO groups present. The organofunctional silaceous material may be inserted as an additive to the urethane composition. Alternatively, the silaceous material may be reacted with the urethane polymer system present in the coating composition prior to application to the foamed structure. The silaceous material also reacts with the moisture in both of these cases to polymerize.

By "organofunctional silaceous material" it is meant an organofunctional silicon containing material. Such silicon containing materials are characterized as silanes or siloxanes or silsesquioxane and the like. See U.S. Pat. Nos. 5,182,174; 5,286,569; 5,225,248; 5,230,962 and 5,354,808 which are hereby incorporated by reference.

The silaceous containing material is a known material. The amount of organofunctional silaceous material that is utilized ranges from 0.1 to 10% by wt. of total coating composition, preferably, 0.5 to 5%.

While Applicant does not wish to be bound to any particular theory, it is believed that the processes outlined herein is a technique for the organofunctional silaceous material being operative in the present case. The organofunctional silaceous material has a function or group that reacts with the isocyanate composition preferably during preparation of the composition. Another portion of the silaceous material is hydrolyzable and therefore, it is believed that it reacts during the curing process.

While the preferred material is a urethane composition, other polymer systems may be utilized providing they preferably do not have free reactive functional groups during the application to the foam.

The silaceous materials may be silane esters, vinyl silanes, methacryloxy silanes, epoxy silanes, sulfur containing silanes, amino functional silanes, ureido functional silanes, isocyanato functional silanes and the like. The preferred silane material is bis-(gamma-trimethoxy silylpropyl) amine.

Other silane materials that may be used are as follows:
Allyltrimethoxysilane
Allyltrimethylsilane
N-(2-Aminoethyl)-3-Aminopropyl-Methyldimethoxysilane
N-2-Aminoethyl-3-Aminopropyltrimethoxysilane
3-Aminopropylmethyldiethoxysilane
3-Aminopropyltriethoxysilane
3-Aminopropyltrimethoxysilane
Bis(Dimethylamino)dimethylsilane
Bis-(N-Methylbenzamide)ethoxymethylsilane
Bis(Trimethylsilyl)Acetamide
n-Butyldimethylchlorosilane t-Butyldimethylchlorosilane
Chloromethyltrimethylsilane
3-Chloropropyltriethoxysilane
3-Chloropropyltrimethoxysilane
Di-t-butoxydiacetoxysilane
N,N-Diethylaminotrimethylsilane
Dimethylchlorosilane
Dimethyldichlorosilane
Dimethyldiethoxysilane
Dimethylethoxysilane
dimethyloctadecylchlorosilane
diphenyldimethoxysilane
1,3-Divinyltetramethyldisilazane or
Disiloxane
Ethyltriacetoxysilane
(3-Glycidoxypropyl)Methyldiethoxysilane
(3-Glycidoxypropyl)trimethoxysilane
1,1,3,3,5,5-Hexamethylcyclotrisilazane
Hexamethyldisilane
Hexamethyldisilazane
Isobutyltrimethoxysilane
3-Mercaptopropylmethyldimethoxysilane
3-Mercaptopropyltrimethoxysilane
3-Mercaptopropytriethoxysilane
3-Methacryloxypropyltrimethoxysilane
3-Methacryloxypropyltris(Methylsiloxy)-Silane
N-Methylaminopropyltrimethoxysilane
Methylcyclohexydichlorosilane
Methyllcyclohexyldimethoxysilane
Methyltriacetoxysilane
Methyltrichlorosilane
Methylltriethoxysilane
Methyltrimethoxysilane
N-Methyl-N-Trimethylsilyltrifluoroacetamide
Octadecyltrichlorosilane
Octamethylcyclotetrasiloxane
Octyldimethylchlorosilane
Octyltrichlorosilane
n-Octyltriethoxysilane
1,1,1,3,3-Pentamethyl-3-Acetoxydisiloxane
Penyltriethoxysilane
Phenyltrimethoxysilane
n-Propyltrimethoxysilane
Ethylpolysilicate
Tetra-n-Butoxysilane
Tetrachlorosilane
Tetraethoxysilane
Tetrakis (2-Ethoxyethoxy)Silane
Tetrakis (2-Methoxyethoxy)Silane
Tetramethoxysilane
1,1,3,3-Tetramethyldisiloxane
Tetramethylsilane
Tetrapropoxysilane
Trichlorosilane
N-[3-(Triethoxysilyl)Propyl]-4,-5-Dihydroimidazole
N-(Triethoxysilylpropyl) Urea
Triethylchlorosilane
Triethylsilane
Trimethoxysilylpropyldiethyleneetriamine
N-Trimethoxysilylpropyl-N,N,N-Trimethyl Ammonium Chloride
Trimethylbromosilane
Trimethylchlorosilane
Trimethylsilylacetamide
Trimethylsilyliodide
Trimethylsilylnitrile
Trimethylsilyltrifluoromethanesulfonate
Vinyldimethylchlorosilane
Vinylmethyldichlorosilane
Vinyltrichlorosilane
Vinyltriethoxysilane
Vinyltrimethoxysilane
Vinyltris(2-Methoxyethoxy)Silane
Amino Functional Silane
Glycol Functional Silane
Di Amino Functional Silane
Vinyl-Amino Functional Silane
Octyltriethoxysilane
Methyltriethoxysilane
Methyltrimethoxysilane
tris-[3-(Trimethoxysilyl)propyl] isocyanurate
gamma-Methacryloxypropyltrimethoxysilane
beta-(3,4-Epoxycyclohexyl)ethyltrimethoxysilane
gamma-Glycidoxypropyltrimethoxysilane
gamma-Mercaptopropyltrimethoxysilane
Polysulfidesilane
gamma-Aminopropyltriethoxysilane
Aminoorganosilane
gamma-Aminopropyltrimethooxysilane
N-beta-(Aminoethyl)-gamma-aminopropyltrimethoxysilane
Triaminofunction Silane
Bis-(gamma-trimethoxysilylpropyl)amine
Polydimethylsiloxane
Polyazamide Silane
gamma-Ureidopropyltrialkoxysilane
gamma-Ureidopropyltrimethoxysilane
gamma-Isocyanatopropyltriethoxysilane The compositions may be cured at a temperature range of approximately 150–375° F. for a period of time of 60 seconds to 300 seconds.

A wide variety of organic solvents can be utilized for the commercially available coating compositions. It is well known to be able to utilize aromatic hydrocarbons such as toluene and xylene, alkylesters such as ethylacetate, propylacetate, butylacetate and the like; alcohols such as alkanol materials may likewise be used; ketones as dialkyl ketones may also be utilized; ethers as dialkylethers may, likewise, be utilized. Water may also be used when a water based dispersion is the composition applied to the foam panel.

The organofunctional silaceous material may be reacted with the urethane containing —NCO groups in a well known manner. The reaction product is the coating applied to the foam member. Many patents teach the reaction of silaceous materials with urethane polymers such as U.S. Pat. Nos.

4,645,816; 4,374,237; 5,354,808; 5,286,569; 5,225,248; 5,632,557; 5,378,735; 5,306.765; 5,182,174; 5,230,962; 5,366,807; 5,368,943; 5,204,404; and 5,270,082, all of which are hereby incorporated by reference.

The overall process of preparing the trim panel can be described as follows. Turning to a review of the drawings, the preferred process involves the formation of a laminate of the foam panel together with a layer of reinforcing fibers and an outer layer of a scrim member.

In accordance with the present invention, a rigid multi-layer composite article 20 comprises a sheet of an open cell foam material 22, one or more layers of a fibrous reinforcing material 24 disposed on the surfaces of the foam material 22, a polymerized binder containing the silaceous material dispersed throughout the foam material 22, throughout a part or all of the reinforcing material 24, and adhering the foam material 22 and the fibrous reinforcing material 24 together in fixed rigid relationship, and at least one surface layer 26 adhesively affixed to a surface of the fibrous reinforcing material 24.

The present invention pertains to the utilization of foam core materials that are used in trim panels. Such techniques for preparing such foam core materials are well known in the art. See, for example, U.S. Pat. Nos. 5,308,678; 5,068,001; and 5,393,474, hereby incorporated by reference.

Referring to FIG. 1, a composite article 20 according to a preferred embodiment of the present invention is shown. The article 20, a panel, is relatively lightweight and flexible. It comprises a foam core 22 having reinforcing layers 24 and 25 located on the surfaces or sides of the foam core 22.

The reinforcing layers 24 and 25 are preferably made of glass fibers. However, other natural and synthetic fibers can be used. An adhesive layer or film 29 is applied over the reinforcing layer 24 and is used to bond an outer surface layer 26 to the reinforcing layer 24. The outer surface layer 26 comprises the exterior surface of the composite article 20 of the present invention and is utilized for decorative purposes.

The foam core 22 can be of uniform thickness and can be made from soft, flexible sheets of any suitable expanded, reticulated or open cell plastic material such as a polyether, polyolefin, polyester, polyurethane, or any combination thereof.

The foam core 22 is impregnated or saturated with a heat accelerated liquid hardening binder containing the silaceous material which enters and fills the cells of the foam, coating the, cell walls.

The foam panel that is utilized in the present invention has a porosity of 10–50%. It is characterized as an open cell foam material weighing 1 pound/ft.$^3$ in untreated state. After treatment, it has a specific gravity of about 0.5 to 0.9 g/cc. The urethane material that is applied to the foam panel is at a weight ranging from 300 to 1000 grams per sq. meter.

In preparing the preferred embodiment of the invention, as shown in FIG. 1, the binder resin, such as a urethane, completely permeates and encapsulates the reinforcing layers 24 and 25 which serves as the outer layers of the composite article.

In preparing a preferred embodiment of the composite article of the present invention, the foam core 22 is fed from a stock reel (in FIG. 2) which contains foam stock which has been previously sized to the desired thickness. In the present invention the thickness of the foam material is approximately 7 mm; however, the foam core 22 can be of any thickness and can be varied to meet manufacturing specifications. The foam which makes up the foam core 22 is unrolled from the stock reel 40 and passes through a binder bath 42 which contains the binder. The preferred composition is the urethane system with the organofunctional silaceous material contained therein. There the —NCO component of the urethane polymer is reacted with the organofunctional silaceous mateiral resulting in no free —NCO groups. Alternatively, the —NCO groups are available for reacting during the application of the urethane to the foam panel. In an alternate embodiment, the catalyst activatible liquid binder is preferably polymeric MDI (4-4'-diphenylmethane di-isocyanate). However, other isocyanates such as TDI (toluene di-isocyanate), IPDI (isophoronediisocyanate), phenyl isocyanate, and $H_{12}MDI$ may be used as substitutes for the MDI.

The MDI binder saturates the foam and through a process of polymerization of the MDI rigidizes the cell walls of the foam core 22 by forming isocyanurate linkages, urethane linkages, urea linkages, trimer linkages, biuret linkages, and/or allophante linkages. The binder functions as an adhesive to bind together the layers of the composite article.

The MDI saturated foam 22 exits the binder bath 42 and is compressed between a set of calender rolls 44 which are used to control the amount of MDI retained in the foam core 22. The amount of MDI saturation is commonly referred to as the saturant level. By controlling the saturant level (amount), it is possible to vary the rigidity of the article 20 produced. Since the degree of rigidity (soft (←—→hard) of the composite article 20 is a function of both the type and the amount of saturant present, i.e., %MDI, varying the type or the amount of saturant directly effects the rigidity of the composite article 20. That is, by controlling the amount of saturant in the foam 22 by either squeezing the saturant out of the foam 22 using the calender rolls 44 or by diluting or thinning the concentration of saturant in a suitable solvent such as 1,1,1-trichloroethane, propylene carbonate, or methylene chloride, a composite article 20 can be produced having any desired degree of resilience or yieldability. Therefore, a composite article 20 can be produced wherein the foam core 22 provides structural rigidity ranging from very soft (little or no structural support, very resilient) to very rigid (good structural support, not resilient). The saturant range can be from 300–1500 g (MDI) for 20 mm of foam.

The foam core 22 with the desired amount of MDI may be treated in a catalyst spray 46 with a polymerization catalyst which catalyzes the polymerization of the isocyanate and water. The catalyst is sprayed directly onto the MDI impregnated foam core 22 utilizing methods and apparatus known to those skilled in the art.

Catalysts utilized in the isocyanate chemistry are well known in the art. See, for example, U.S. Pat. No. 5,354,808 hereby incorporated by reference. Catalysts that may be utilized are amine catalysts, the catalysts may also be acids or organic bases. Typical organic bases include triethyl amine, pyridine and the like. While strong acids and Lewis acids may also be utilized. Other catalysts that may be used are organo metallic compounds such as tin derivatives.

Tailoring performance to improve processing properties of polyurethanes requires the selection of efficient catalysts. Generally, an increase in base strength in tertiary amines increases the catalytic strength, wherein the catalytic activity of tertiary amines is the result of the free electron pair on the nitrogen. The availability of the free electron pair for complexation is more important than its relative base strength. Typical amine catalysts useful in the present invention include triethyl-amine, and those known under the trade names "Dabco" (Air Products and Chemicals), "Niax" (Union Carbide Corporation), "Polycat" (Abbott), and "Thancat" (Jefferson Chemical Company).

Organometallic compounds useful in catalyzing the reaction of isocyanates with macroglycols include, di-n-butyltin dilaurate, as well as carboxylic acid salts of calcium, cobalt, lead, manganese, zinc, and zirconium employed as cocatalysts with tertiary amines, tin compounds and tin-amine combinations.

Following exit from the calender roll 44, the multi-layered composite 20 is assembled. The foam core 22 receives a fibrous reinforcing material in the form of a layer or mat of reinforcing fibers. The foam core 22 can receive one or more layers or mats of fibrous reinforcing material 24. Each surface of the foam core 22 typically receives a layer or mat of fibrous reinforcing material 24. The fibrous material which comprises the reinforcing material 24 can be of natural or synthetic material. Natural fibrous materials suitable for use in the reinforcing material 24 include animal or vegetable fibers. Suitable fibers may include glass fibers, synthetic fibers such as Kevlar®, or other synthetic fibers known to those skilled in the art. The preferred material for use in the reinforcing layer 24 is glass fiber.

The fibrous reinforcing material 24 is necessary in order to provide added strength and stiffness to the composite article 20. Additionally, because the reinforcing material 24 is typically constructed of chopped or random continuous fiber strand material, voids or interstitial spaces are created within the weave of the reinforcing material 24. These voids or interstitial spaces allow the heat accelerated binder compound, i.e., urethane, to flow through the voids or interstitial spaces and permeate and saturate the fibers of the reinforcing material 24. Saturation of the fibers of the reinforcing material 24 with the binder compound allows, upon catalyzation, for formation of a mechanical bond between the foam core 22 and the reinforcing material 24. That is, when the binder compound is catalyzed to form a thermosetting material, the same curing reaction that stiffens the foam core 22 mechanically bonds the reinforcing material 24 to the foam core forming an essentially integral layer.

After the reinforcing material 24 is applied to the foam core 22, an exterior or outer surface layer 26 may optionally be applied to the reinforcing material 24. The outer surface layer 26 can be any suitable material such as scrim, foam, or plastic sheet. The outer surface material 26 is chosen with a particular application in mind. That is, should a multi-layered composite panel 20 be required to have impact or energy absorbing characteristics, a foam exterior layer can be applied.

The scrim material can be any suitable material such as a polyester fabric, cellulose, rayon, nylon, propylene, vinyl, olefin, or other suitable thermoplastics known to those skilled in the art.

The outer surface layer 26 can be adhesively bonded directly to the reinforcing material 24 with the same urethane which bonds the reinforcing material 24 to the foam core.

An additional adhesive layer 29 (intermediate layer) may be optionally used to bond the exterior or surface layer 26 to the reinforcing material 24. The adhesive can be a film or sheet of a thermoplastic material such as a polyester, polyamide, or ethylacrylic acids (EAA, Dow Chemical) which melts or forms bonds at die molding and polymerization reaction temperatures. The adhesive layer 28 is applied to the reinforcing material 24 in between the layers of reinforcing material 24 and the exterior or surface layer 26. Under the heat of molding, the adhesive layer 28 melts and forms a bond between the reinforcing material 24 and the exterior or surface layer 26.

In addition to bonding the exterior or surface layer 26 to the reinforcing material 24, prior to melting, the adhesive layer 29 also serves as an occlusive barrier, preventing migration of the urethane binder to the exterior or surface layers 26. By preventing the migration of the urethane to the exterior or surface layers 26, i.e., a foam exterior layer, the surface characteristics of the foam exterior layer 26 can be maintained without the influence of the urethane hardening solution.

The adhesive layer or film 29 is positioned over the layers of reinforcing material 24, and finally the surface layer 26 of foam/scrim is applied to complete the formation of the composite article 20. Each of the constituents which comprise the multi-layered composite article 20, i.e., the reinforcing material 24, the adhesive layer 28, and the surface layers 26 are fed from continuous stock reels (shown in FIG. 2). The multi-layered composite 20 is then passed through a second set of calender rolls 48 which impregnate the reinforcing material 24 with the urethane, polymerization catalysts, and any other ingredients.

The continuous length of the multi-layered composite 20 is then conveyed through a shearing apparatus 50 which cuts the multi-layered composite 20 to desired length. The sheared lengths of the multi-layered composite 20 are then placed into a tenter frame (holding frame) (not shown). The tentered composite is then transported to a die press/mold 52.

The die press/mold 52 is maintained at a temperature between 200° F. and 400° F. It is at this temperature that the polymerization reaction occurs, and the foam core 22 becomes a rigid thermosetting plastic. The multi-layered composite 20 is pressed between male and female die halves to reproduce the configuration of the final article to be made such as automotive interior trim components e.g., headliners, dashboards, armrests, etc. The die pressed or molded multi-layered composite article 20 is then allowed to cure for between 15 to 90 seconds and is then removed from the press/mold 52 for trimming and other post assembly processing.

The polymerization of diisocyanates with glycols to produce polyurethanes from liquid monomers is well known. Polyurethanes contain carbamate groups (—NHCOO—), also referred to as urethane groups, in their backbone structure. In the present case, many polyols may be used.

The preferred polyols used to make the polyurethane prepolymers and polymers are polyester polyols. Polyether polyols may also be used and are addition products derived from cyclic ethers such as ethylene oxide, propylene oxide, tetrahydrofuran, and the like.

Polyester polyols are more preferred for use in the present invention than polyether polyols. The polyester polyols of choice are macroglycols (glycols having greater than about 5 repeat units) with a low acid number and low water content, and typically have a molecular weight (number average) of about 2000.

Polyester polyols for use in the present invention are particularly preferably made by the reaction of caprolactone with a suitable glycol such as ethylene glycol, propylene glycol, diethylene glycol, dipropylene glycol, 1,4-butanediol, and 1,6-hexanediol. The reaction of caprolactone with a suitable diol yields a polycaprolactone.

Polycaprolactone diols are available from Union Carbide under the trademark "TONE".

Other suitable polyols would include polytetramethylene ether glycol, polyethylene glycol, polybutylene adipate, hydrogenated bisphenyol A, cyclohexane dimethanol, hydroquinone bis hydroxyethyl ether (HQEE) and the like.

Other active hydrogen containing materials, besides polyols, that can react with the isocyanate are amines.

Polyamines

As previously mentioned, the active hydrogen-containing compounds may be polyamines, particularly nonaromatic diamines. Preferred nonaromatic diamines for use in the present invention include ethylenediamine, propylenediamine, hexamethylenediamine, isophoronediamine, cyclohexanediamine, and bis-(aminopropyl)methylamine.

Aromatic polyamines may be partially or totally substituted for nonaromatic polyamines as desired.

Polyisocyanates

The term "pblyisocyanate" includes diisocyanates and compositions including monoisocyanates and diisocyanates, and compositions including mono-, di-, and polyisocyanates. Thus, although diisocycanates are preferred, it is within the scope of-the invention to use polyisocyanates in combination with diisocyanates, and even with small amounts of monoisocyanate, as disclosed in U.S. Pat. No. 4,567,228, incorporated herein by reference. The average functionality of the isocyanate reactants is important in controlling the tendency of the polymer to gel. When polyisocyanates are used, some monofunctional isocyanate should be present to reduce the average isocyanate functionality. In some instances it is desirous to use so-called "blocked" isocyanates, in which all isocyanates groups are blocked with a suitable blocking agent containing an active hydrogen. Commercial blocking agents include caprolactam, phenol, and acetone oxime. As the "free" or released blocking agent is typically generated in a thermal unblocking process, and since the free blocking agents can function as plasticizers, blocked isocyanates may be preferred in certain coating formulations.

Suitable non-aromatic cyclic diisocyanates for use in the present invention included hexamethylene diisocyanate (HDI), methylenebis-(4-cyclohexylisocyanate) ($H_{12}MDI$) and isophorone diisocyanate (IPDI). Also useful are isophorone-based isomeric trimethyl hexamethylene diisocyanates (TMDI), trimerized IPDI, and 1,3-bis (isocyanatomethy) cyclohexane ($H_6XDI$). A particularly preferred diisocyanate is $H_{12}MDI$, known under the trade designation "Desmodur W", available from Bayer, Inc.

The coating composition and the various components to the coating composition can be characterized as follows:

| | |
|---|---|
| Polymerizable Binder e.g., polyurethane | 80–98 wt % |
| organofunctional silaceous material | 1–20 wt % |
| catalyst | 0.01–5 wt % |
| Total | 100 wt %. |

Having described the invention above, listed below are preferred embodiments wherein all parts are parts by weight and all degrees are degrees centigrade unless otherwise indicated.

EXAMPLE 1

Following the procedure outlined above and in the drawing for the preparation of the trim panel, FIG. 2 the urethane material is prepared as follows from the following composition:

| | |
|---|---|
| Tone 0305 | 10.52 |
| DC193 | 0.30 |
| Rucoflex 105–110 | 5.14 |
| Desmodur W | 16.12 |
| Dibutyl tin dilaurate | 0.01 |
| BGTSPA | 19.74 |
| Toluene | 48.17 |
| TOTAL | 100.00 |

Tone 0305 is a polycaprolactone polyester polyol with an approximate functionality of three, a hydroxyl number of 310, and is sold by Union Carbide Corporation, 39 Old Ridgebury Road, Danbury Conn. 06817-0001.

DC 193 is a reactive silicone surfactant that is used as a flow control agent with an approximately functionality of three, a hydroxyl number of 75, and is sold by Air Products and Chemicals, 7201 Hamilton Boulevard, Allentown Pa. 18195-1501.

Rucoflex 105–110 is a hexanediol adipate based polyester polyol with a functionality of two, a hydroxyl number of 110, and is sold by Ruco Polymer Corporation, New South Road, Hicksville, N.Y. 11802.

Desmodur W is bis(4-isocyanatocyclohexyl) methane, PICM, hydrogenated MDI (HMDI or $H_{12}MDI$ or dicyclohexylmethane 4,4'-diisocyanate with an approximately % free NCO of 31.82%, and is sold by Bayer Corporation, 100 Bayer Road, Pittsburgh, Pa. 15205.

BGTSPA is bis-(gamma-trimethoxysilylpropyl)amine with a isocyanate reactive functionality of one. It is used to react with the isocyanate terminated monomers and oligomers and thus provide an isocyanate free coating. The six methoxy groups on the silane are hydrolyzable using moisture and a catalyst such as dibutyl tin dilaurate. This enables secondary crosslinking reactions to occur with the formation of siloxane linkages.

The silaceous containing composition is prepared from a resin formulation listed below. This resin formulation is 40% solids content with a % free –NCO of 2.72%.

| | |
|---|---|
| Tone 0305 | 13.11 |
| DC 193 | 0.38 |
| Rucoflex 105–110 | 6.41 |
| Desmodur W | 20.09 |
| Dibutyl tin dilaurate | 0.01 |
| Toluene | 60.00 |
| TOTAL | 100.00 |

The silaceous containing composition described above is prepared as follows. 100 grams of the resin formulation, at room temperature, are weighed into a suitable container. About ⅓ of the amount (8 grams) that represents a 5% excess of BGTSPA (the total is about 24.1 grams) is added to the container with agitation. There is an exothermic reaction observed. The container is allowed to cool to room temperature (about 15 minutes). Subsequent additions are performed the same way until the total amount is added. The silaceous containing binder composition is now available for use. This silaceous containing binder composition is used to impregnate the foam panel as shown in FIG. 2.

EXAMPLE 2

Another binder may be prepared as follows. The polymer is prepared by reacting the polyol with a slight molar excess (5%) of —NCO, that is, 2.05 equvalent of –NCO to 1 equivalent of polyol. The silaceous material is then added at a slight molar excess (5%) to ensure that all of the –NCO groups are fully reacted.

Another typical formulation that may be used is as follows:

| Components | Percent By Weight |
| --- | --- |
| HQEE (1 eq.) | 43.59 |
| MDI (2.05 eq.) | 56.41 |
| TOTAL | 100.00 |

% free–NCO=0.48 wt. %

HQEE=Hydroquinone-bis-hydroxyl ethyl ether
IMDI=Methylene diphenyl diisocyanate

The aforementioned material may be prepared by melting the HQEE in a reactor and adding molten MDI; alternatively, the two materials may be blended together by a twin screw extruder to heat the materials.

The prepolymer is further reacted with gamma-amino isopropyl trimethoxy silane to ensure complete elimination of all free isocyanate groups as follows:

Prepolymer from above formulation:

| Components | Percent By Weight |
| --- | --- |
| HQEE | 96.05 |
| Silane (EW 1.5 EW 1.05/1 silane/ HQEE) | 3.95 |
| TOTAL | 100.00 wt % |

Figure 2:
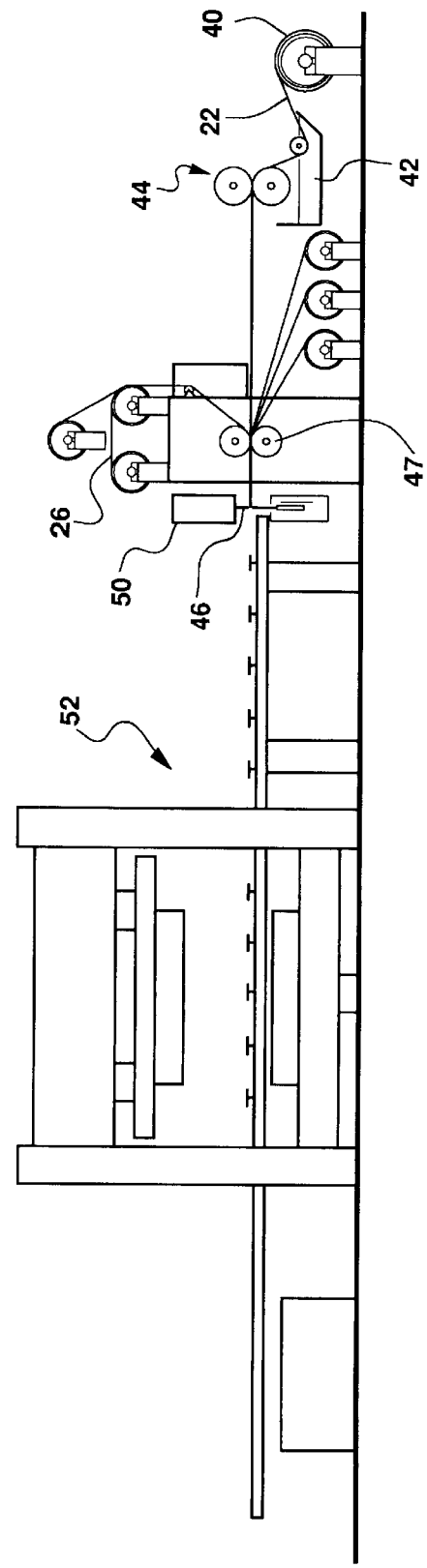
FIG. 2 is a schematic representation of the process of making the composite article of the trim panel of the present invention.

The silaceous containing coating composition may be used to impregnate the foam panel as shown in FIG. 2.

While the forms of the invention herein disclosed constitute presently preferred embodiments, many others are possible. It is not intended here to mention all the possible equivalent forms or ramifications of the invention. It is understood that the terms used herein are merely descriptive, and that various changes may be made without departing from the spirit or scope of the invention.

What is claimed:

1. A method of forming a trim panel comprising the steps of:
   providing a foam trim panel and impregnating the foam trim panel with a binder composition to form an impregnated foam trim panel, the binder composition is a urethane containing polymer which has been reacted with an organofunctional silaceous material resulting in no free –NCO groups present in the binder composition during the impregnating of the foam trim panel; and
   shaping and curing the impregnated foam trim panel to a desired configuration by passing the impregnated panel into a mold maintained at a temperature of at least 250° F. so that the organofunctional silaceous material reacts and cures to assist the impregnated foam trim panel in obtaining the desired configuration.

2. The method of claim 1 wherein the foam trim panel has a back and a front face and prior to the shaping step, applying a fiber strengthening member to one of the back and the front face of the foam trim panel.

3. The method of claim 2 wherein a scrim member is applied to the fiber strengthening member.

4. The method of claim 1 wherein the urethane containing polymer composition is prepared from –NCO containing reactants and polyol reactants in a ratio of OH/NCO greater than 1.0.

5. The method of claim 1 wherein the binder composition in the impregnated panel ranges from about 50 g to 1000 g/meter$^2$ of impregnated panel member.

6. The method of claim 1 wherein the foam panel has a density of 1 g to 20 g/sq ft. prior to the step of impregnating the foam trim panel with the binder composition.

7. The method of claim 1 wherein the binder composition is comprised of the following components:

| Components | (wt % of total composition) |
| --- | --- |
| Polymerizable Binder | 80–98 wt % |
| organofunctional Silaceous material | 1–20 wt % |
| catalyst | 0.1–5 wt %. |

8. The method of claim 1 wherein the organofunctional silaceous material is a silane.

* * * * *